May 9, 1967 J. G. BRYANT 3,318,630
MATERIALS HANDLING EQUIPMENT
Filed June 11, 1964 2 Sheets-Sheet 1

INVENTOR.
John G. Bryant
BY Synnestvedt & Lechner
ATTORNEYS

May 9, 1967 J. G. BRYANT 3,318,630
MATERIALS HANDLING EQUIPMENT
Filed June 11, 1964 2 Sheets-Sheet 2

INVENTOR.
John G. Bryant
BY
Synnestvedt & Lechner
ATTORNEYS

United States Patent Office 3,318,630
Patented May 9, 1967

3,318,630
MATERIALS HANDLING EQUIPMENT
John G. Bryant, 15 Ridgewood Road, Radnor, Pa. 19087
Filed June 11, 1964, Ser. No. 374,329
13 Claims. (Cl. 294—104)

This invention relates to materials handling equipment useful, for example, in manufacturing and fabricating shops and on construction sites for lifting and transporting heavy articles, such as steel plates, tank covers and the like. More specifically, the invention relates to improvements in clamp devices which provide a means for attaching the article to be lifted to a hoisting mechanism.

The invention provides improvements in gravity-type clamp devices, that is, a device having a pair of pivotally interconnected jaws which are arranged so that the suspended weight of the article being lifted is used to cause the jaws to tightly grip the article.

One of the principal objects of the invention is to provide an improved gravity-type clamp of the kind in question having simple and reliable means which will securely and positively lock the clamp on the article prior to the hoisting operation. In the preferred form the locking means comprises a tapered pin disposed between the jaws for engagement therewith and mounted to be moved so as to increase or decrease the actual diameter extending between the jaws. With decreasing diameter, the jaws are free to open to receive the article to be lifted. With increasing diameter, there is an increasing reaction on the jaws which causes the same to be forced into tight gripping engagement with the article to be lifted.

Another object of the invention is to provide an improved gravity-type clamp of the kind in question having reliably and conveniently usable means including a tapered pin which is manipulated prior to lifting to induce a force on the jaws to cause the same to securely and positively lock the clamp on the article and which functions during lifting to exert a gravity induced force on the jaws to cause the same to maintain and/or increase the gripping force.

Another object of the invention is to provide an improved gravity-type clamp of the kind in question having a tapered pin effective to exert a force on the jaws which causes the jaws to grip the article together with pin-operating shackle means conneced to the clamp so as to provide the pin to produce the gravity induced force on the jaws the moment lifting occurs.

Another object of the invention is to provide an improved gravity-type clamp of the kind in question having a tapered pin for exerting a force on the jaws to cause the same to grip the article together with means biasing the pin to continually exert a force on the jaws and insure a gripping force even when the lifting operation causes the article to come to rest so that there is no gravity load.

Another object of the invention is to provide an improved gravity-type clamp of the kind in question having a tapered pin adapted to engage the jaws and cause the same to positively grip the article to be lifted, the pin being provided with a spring-actuated hold-out means which can hold the pin in an inoperative position wherein the jaws may be opened to receive an article to be lifted, or which can drive the pin into engagement with the jaws to cause the same to tightly grip the article.

Another object of the invention is to provide an improved gravity-type clamp wherein the gripping jaws having gripping surfaces constructed to prevent the clamp from "walking" due to the swinging of the article during hoisting, the gripping surfaces preferably taking the form of arcuate teeth which are concave with respect to the receiving ends of the jaws.

Another object of the invention is to provide an improved gravity-type clamp wherein the ends of the gripping jaws are configured to provide for easy acceptance of the edge of an article between the jaws, the ends being preferably formed by surfaces which diverge outwardly to form a tapered mouth.

Another object of the invention is to provide an improved structure for gravity-type clamps such structure making a clamp which is rugged, reliable and relatively low cost to manufacture, a clamp which is readily adaptable for manufacture in various load carrying sizes and a clamp of any one size which is capable of accepting articles having a wide range of thicknesses.

How the foregoing is accomplished, together with other objects and advantages of the invention will be apparent from the following description and drawings wherein.

Figure 7:
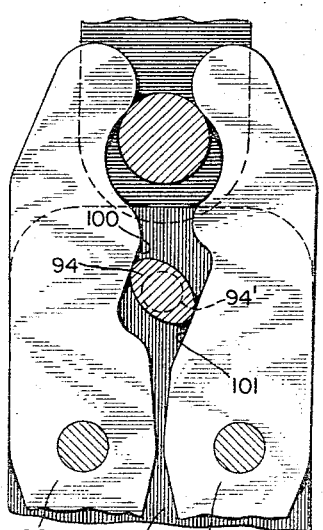
Figure 9:
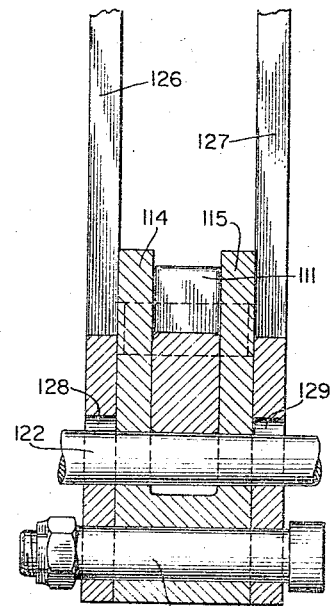
Figure 8:
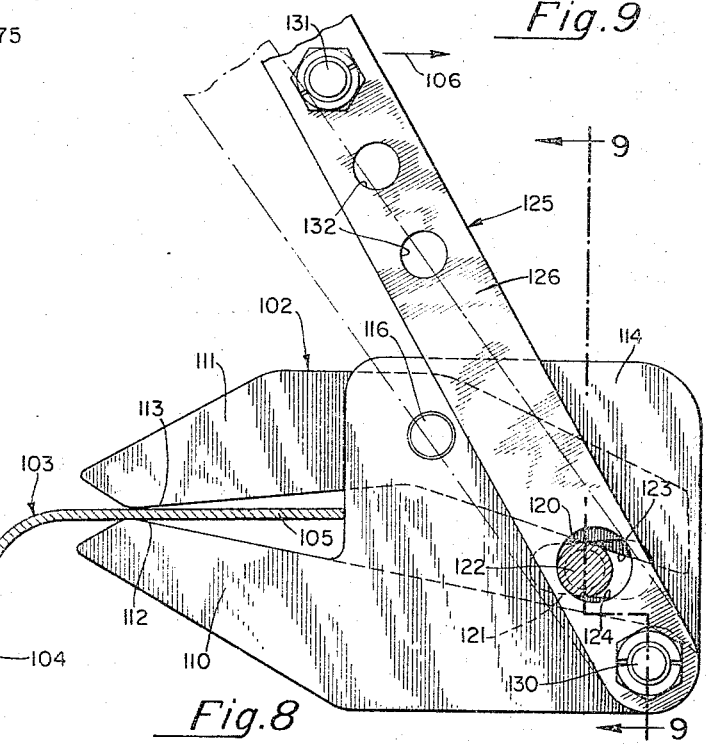

FIGURE 7 is an elevational view of another embodiment of the invention wherein the tapered pin is replaced by an eccentric which serves to engage the jaws and cause the same to tightly grip the article, the eccentric is used for the locking operation but not in the hoisting or lifting operation; and FIGURE 8 is a side elevation view of an embodiment of the invention which is constructed to provide a gravity induced force on the jaws the moment lifting occurs;

FIGURE 9 is a view taken along the lines 9—9 in FIGURE 8.

Figure 1:
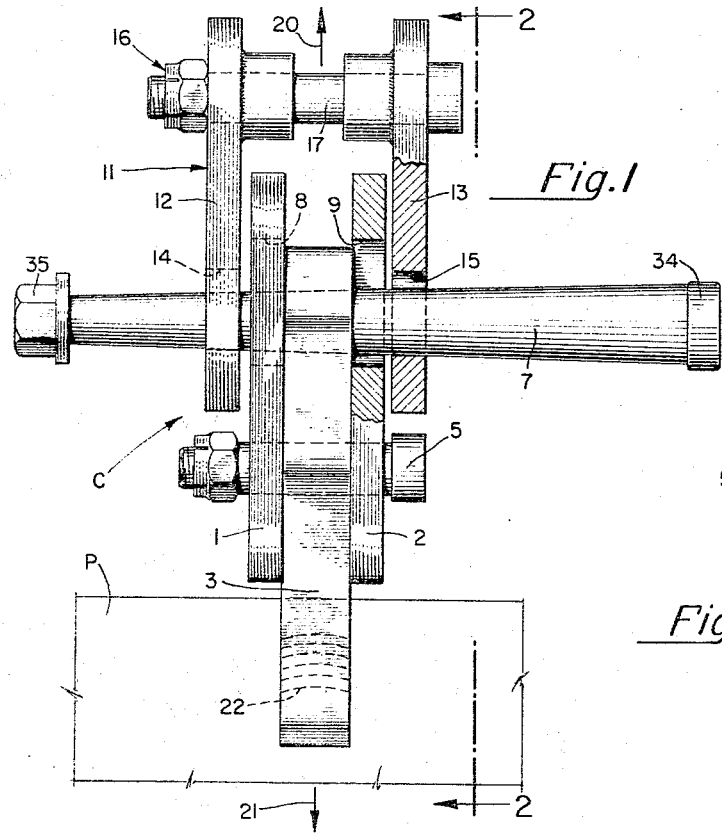
FIGURE 1 is an elevational view partially in section illustrating a typical clamp constructed in accordance with the invention.

FIGURE 1 illustrates a typical clamp C for lifting heavy objects or articles, such as large steel plates. The clamp has a frame which includes the side plates 1 and 2 separated to provide a space for the gripping jaws 3 and 4. The jaws 3 and 4 grip the plate P. A pair of pivot pins 5 and 6 interconnect the plates 1 and 2 and provide for relative rotation of the jaws 3 and 4. A tapered pin 7 extends through apertures 8 and 9 in the side plates 1 and 2 and also extends between the jaws 3 and 4. A shackle mechanism 11 has arms 12 and 13 provided with apertures 14 and 15 which surround the pin 7. A crosspiece 16 interconnects the shackle arms 12 and 13. The mid section 17 of the crosspiece is adapted to receive a hook or other carrier connected to the hoisting mechanism.

When the hoisting mechanism provides an upward lifting force (see arrow 20), the force is transferred through the shackle mechanism 11, the tapered pin 7, and through the jaws to the plate P. The weight of the plate provides a downward force (see arrow 21). The jaws 3 and 4 are respectively formed with gripping surfaces 22 and 23 which face one another and grip opposite sides of the plate P. As shown each gripping surface is comprised of arcuately-shaped teeth.

The clamp is constructed so that in the above described lifting condition the tapered pin 7 exerts a force on the jaws 3 and 4 to cause the same to urge jaw rotation in directions to move the gripping surfaces toward each other. This causes the gripping surfaces to exert a substantial gripping force on the plate P. During the lifting operation the force exerted by the pin on the jaws, of course, is induced by gravity or by the weight of the plate P.

As mentioned heretofore, one of the features of the invention is the provision of a means to positively lock the clamp on an article and to maintain (or sometimes increase) the locking force during the actual lifting operation. Locking the clamp on the article is of considerable importance. For example, most large plates that are to be lifted occupy a horizontal position. Since in clamps of the kind mentioned, the actual gripping force is induced by gravity, the full effect of the weight of the article will not be available until at least part of the plate is off the ground. Also, when the plate is vertically oriented with one edge on the ground, there can be a condition wherein the gravity load is minimal or even zero.

In either of the above instances the force of gravity may not come into play and the clamp will slip off the plate. The present invention remedies this defect by providing a means for positively locking the clamp on the article so that the clamp cannot slip off even when the gravity load is zero. The manner in which this is done is explained below.

Before describing the locking arrangement, I want to point out that the invention contemplates clamp structure wherein the effect of gravity is available for gripping the moment the hoisting operation begins. This structure will be described hereinafter.

Figure 2:
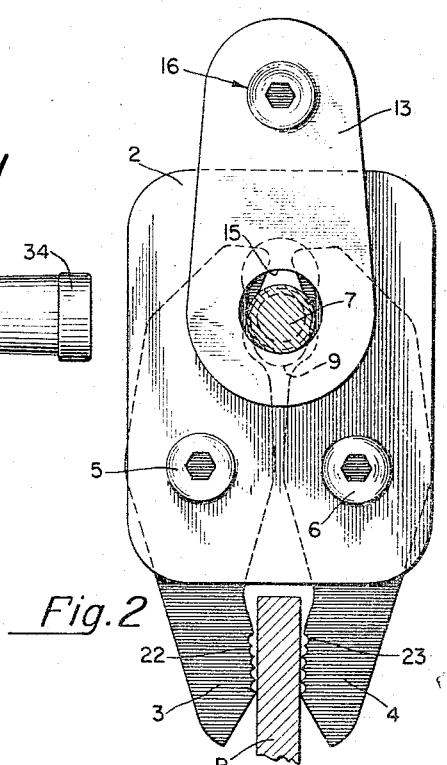
FIGURE 2 is a view taken along the lines 2—2 of FIGURE 1 and illustrating how the jaws of the clamp of FIGURE 1 are adapted to hold an article of relatively large thickness.
Figure 3:
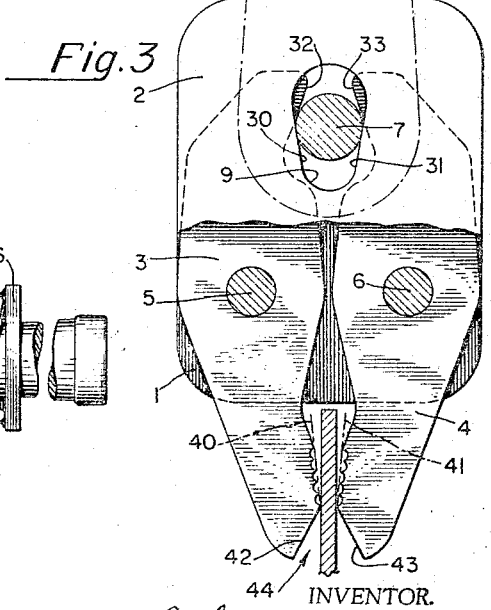
FIGURE 3 is a view similar to FIGURE 2 with certain parts cut away and illustrating how the jaws of the clamp of FIGURE 1 are adapted to support an article of relatively small thickness.

The apertures 8 and 9 in the side plates 1 and 2 have a tapered configuration as indicated by the aperture 9 in FIGURES 2 and 3. The aperture 9 of the side plate 2 has a pair of surfaces 30 and 31 which diverge in a vertical direction. The aperture 8 in the side plate 1 is similarly configured. These surfaces are termed "locking surfaces" and one of their functions is to support the tapered pin 7 for movement in opposite directions between the jaws.

The upper ends of the jaws 3 and 4 are formed with surfaces 32 and 33 which face one another and converge in a vertical direction. These surfaces are termed "torque surfaces." When the pin is moved to the left (as viewed in FIGURE 1) to increase the diameter between the jaws, the torque surfaces are engaged by the pin and are forced to move in a direction away from one another. This causes rotation of the jaw 2 counterclockwise and the jaw 3 clockwise so that the gripping surfaces 22 and 23 are moved toward each other so as to grip the article therebetween. The greater the diameter between the jaws the greater the rotational motion.

The locking surfaces 30 and 31 are engaged with the pin and provide support for the pin as it reacts against the torque surfaces 32 and 33. The foregoing is another function of the locking surfaces.

It will be understood, of course, that when an article is disposed between and engaged by the gripping surfaces actual jaw rotation with pin motion is very small. For example, an amount of rotation to effect some penetration of the teeth into the article. The energy developed by the tapered pin on the jaws is manifested as a torque which, of course, urges the gripping surfaces into very tight engagement with the article.

The thrust exerted by the tapered pin on the torque surfaces and the radial distances of the torque and gripping surfaces from the center of rotation determines the amount of gripping force generated by the surfaces 22 and 23.

When the pin is moved to the right, this has the effect of decreasing the diameter of the pin between the jaws so that the pin and torque surfaces are disengaged. The jaws are then free to rotate so that the gripping surfaces move away from one another. Thus, the jaws are in condition to release the grip on an article or for receiving the edge of an article therebetween.

The orientation of the surfaces 30 and 31 performs the important function of cooperating with the tapered pin in a manner to enhance the ability of the pin to exert a locking force on the jaws. With pin motion to increase diameter the diverging locking surfaces 30 and 31 will cause the pin to shift in a vertical direction or toward the torque surfaces 32 and 33. It will be apparent that this action contributes to the force causing or urging jaw rotation to effect a gripping or clamping action on the article.

In locking the clamp of FIGURE 1 on a plate or the like, the jaws 3 and 4 are inserted over the edge and then the pin 7 moved to the left. Considerable locking force can be generated by striking the right hand end 34 of the pin with a hammer. The grip of the jaws can be very quickly released by tapping the left hand end 35 with a hammer to move the pin to the right.

After the clamp is securely locked on the article to be lifted, the pin 7 becomes the vehicle by which the gravity load is utilized to generate a force to cause the jaws to grip the article during lifting. The shackle mechanism 11 is attached to the hoisting hook and then the hoisting mechanism moved in a vertical direction. The hoisting force acting through the shackle mechanism, tends to move the pin 7 upwardly. The pin exerts a force on the torque surfaces 32 and 33 to rotate the jaws 2 and 3 to cause the same to tightly grip the article.

From the foregoing description it will be apparent that the locking mechanism provides a means easily manipulatable by an unskilled operator and which is positive and reliable in the locking and lifting functions.

Referring to FIGURES 2 and 3 it will be observed that the structure of the clamp shown can accommodate plates of considerably varying thicknesses. Within the design thickness limitation, the tapered pin can perform its function of locking the clamp on the plate or other article and tightly grip the same during the lifting or hoisting operation.

Of special importance in the invention is the shape of the arcuate teeth which form the gripping surfaces 22 and 23. It will be noted that the teeth are concave with respect to the open ends of the jaws. The arcs forming the teeth lie on a circle whose radius center is substantially below (as viewed in FIGURE 1) the mouth of the jaws. This radius point lies well within the body area of a plate being lifted.

Often times in lifting a plate the same is prone to swing (left and right as viewed in FIGURE 1) and since the plate is gripped by the clamp somewhere in the center, the plate has a tendency to oscillate. With straight teeth, I have found that the oscillation will cause the clamp to walk off the edge of the plate. However, with arcuate teeth the oscillation will take place substantially near the radius center. With this type of motion the teeeth cut into the plate surface rather than walking off.

In connections with the foregoing, the surfaces 22 and 23 are oriented so that the locus of the teeth tips are converging in a direction toward the end of the clamp jaws. For example, see the loci indicated by 40 and 41 in FIGURE 3. As the lowermost set of teeth cut into the plate, this brings the next adjacent set into intimate contact with the plate so as to preserve the contact and maintain the clamp in position.

Another feature of the invention is in the shape of the ends of the jaws, for example, in FIGURES 2 and 3 it will be seen that the lower ends of the jaws are configured with surfaces 42 and 43 which respectively diverge in a direction away from the gripping surfaces. These diverging surfaces 42 and 43 form a tapered mouth 44. The tapered mouth is of advantage in that it facilitates placing the edge of the article between the jaws.

In certain instances particularly where extremely heavy loads are to be lifted, it is of advantage to maintain a bias on the tapered pin so that the same will always be urged in a direction to exert a force on the jaws to cause the jaws to grip the article. In lifting very heavy objects, the force induced on the jaws due to gravity may be so great that there is additional penetration of the gripping surfaces into the sides of the article. Thus, under no-load condition, for example, when a plate has been transported to the desired place and moved down until it touches the ground, the tapered pin may not be positioned so that there is sufficient diameter between the jaws to maintain the desired grip. In certain instances the grip could become loose so that the clamp might move or even slip off the edge of the article.

To alleviate this condition, the invention contemplates spring means which acts on the tapered pin to bias the same to continuously exert a force on the jaws and insure a positive gripping force at all times. A typical structure to accomplish this is shown in FIGURE 4 where the clamp of FIGURE 1 has been fitted out with a biasing means.

Figure 4:
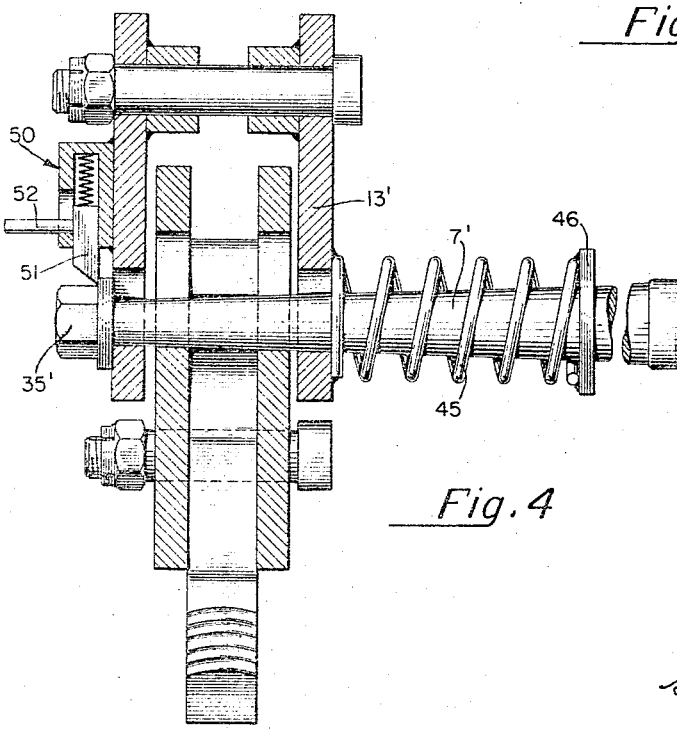
FIGURE 4 is an elevational view partially in section of the clamp of FIGURE 1 provided with a pin biasing means.

In FIGURE 4, the pin 7' is surrounded by a tension spring 45, the left hand end of which is fixed to the shackle arm 13' and the right hand end is fixed to a collar 46 fixedly connected with the pin. The tension spring 45 is designed so that it exerts a force tending to move the pin to the left.

With the above structure it will be apparent that if during the lifting there should be additional tooth penetration, the spring under no-load condition will cause the pin to move to the left to take up any slack between the pin and the torque surfaces on the jaws.

For putting the clamp of FIGURE 4 on the edge of an article to be lifted, the invention contemplates holding the tapered pin 7' in its furthermost position to the right so that the jaws are free to move so as to open the space between the gripping surfaces. For the hold-out function, I have provided a mechanism 50 which includes a spring operated latch 51, the lower end of which contacts the nut 35' on the end of the tapered pin and holds the same in position. For releasing the latch the button 52 is moved upwardly by the operator. At this time the spring takes over and forces the tapered pin to the left.

Figure 5:
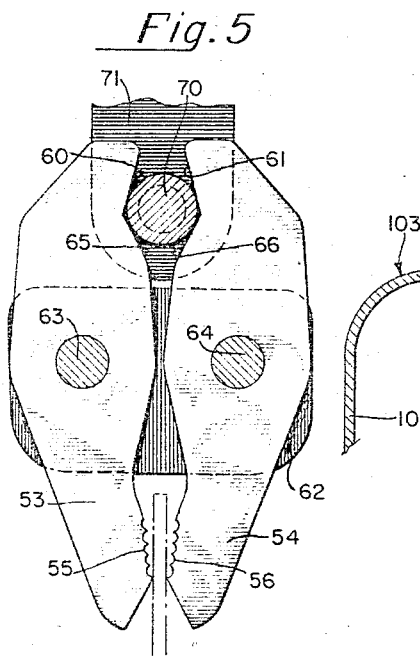
FIGURE 5 is an elevational view illustrating an embodiment of the invention wherein the tapered pin is supported by the surfaces on the jaws.

A simplified version of the embodiment described in FIGURE 1 is shown in FIGURE 5. This is particularly useful for relatively low load applications.

In FIGURE 5 the jaws 53 and 54 are of a construction similar to the jaws 2 and 3 having gripping surfaces 55 and 56 and torque surfaces 60 and 61. The jaws are mounted on a frame means 62 which can be a single side plate or a double side plate similar to the plates 1 and 2 in FIGURE 1. Pivot mechanisms 63 and 64 respectively interconnect each jaw with the frame means.

In the embodiment of FIGURE 5, the locking surfaces are formed on the jaw itself rather than on the frame as in FIGURE 1. It will be observed that the jaw 53 has locking surface 65 and the jaw 54 has locking surface 66. These surfaces perform the same functions as the locking surfaces 30 and 31 in the embodiment in FIGURE 1. The tapered pin 70 engages both the locking surfaces and the torque surfaces in the same manner as described in connection with FIGURE 1. A shackle mechanism connected with the tapered pin 70 is generally indicated by the dotted lines 71.

For locking the clamp device of FIGURE 5 on the article to be lifted, the tapered pin is moved between the jaws so that its diameter increases. The pin engages the locking surfaces 65 and 66 and rotates the jaws so that the gripping surfaces 55 and 56 grip the article. During the lifting the pin is moved against the torque surfaces 60 and 61 and exerts the gravity induced force on the jaws to cause the same to tightly engage the article.

In certain lifting operations, I have found it desirable to have the tapered pin perform only its locking function. In this instance a separate pin is connected with a shackle to impose a gravity induced force on the jaws during lifting.

Figure 6:
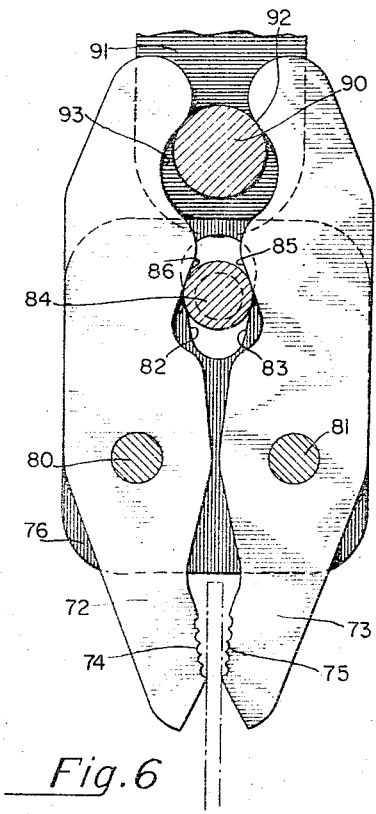
FIGURE 6 is an elevational view illustrating another embodiment of the invention wherein the tapered pin is used solely for locking the clamp on the article prior to lifting.

A typical example of the above type of structure is shown in FIGURE 6 wherein it will be seen that the jaws 72 and 73 have gripping surfaces 74 and 75 and that the jaws are mounted on a frame 76 by the pivot mechanisms 80 and 81.

The frame has locking surfaces 82 and 83 which support the tapered pin 84. The jaws are formed with torque surfaces 85 and 86. As the pin is moved between the jaws within increasing diameter the locking surfaces 82 and 83 cause the pin to engage the torque surfaces 85 and 86. This exerts a force on the jaws and causes the gripping surfaces 74 and 75 to tightly engage the article to be lifted.

The gravity induced force is put on the jaws by virtue of the cylindrical pin 90 which is connected to the shackle mechanism 91. The pin 90 is adapted to engage the torque surfaces 92 and 93 during the lifting operation and this produces a force on the jaws tending to rotate the same so that the gripping surfaces 74 and 75 grip the article.

In FIGURE 7 I have shown an arrangement similar to FIGURE 6 except that the tapered pin has been replaced by an eccentric 94 having a shaft 94' which is rotatably mounted on the frame 95. The jaws 96 and 97 are provided with torque surfaces 100 and 101 which are engaged by the eccentric.

For placing the clamp device of FIGURE 7 on the article to be lifted, the eccentric is turned, say till its long axis is in a vertical direction. This enables the jaws to be open to receive the edge of the article. Then the eccentric is rotated clockwise or counterclockwise so that its edges engage the surfaces 100 and 101. This exerts a force on the jaws tending to rotate the same so that the gripping surfaces (not shown) tightly engage the article.

For the purposes of clarity, I have not shown any means for rotating the eccentric but it is preferable that the eccentric shaft 94' extend outwardly beyond the frame 94 and have an arm extending at right angles to the axis of the shaft. The arm is twisted by hand and then locked in position by a fine toothed rachet mechanism.

In FIGURES 8 and 9 I have shown an embodiment of the invention which is constructed so that the gravity induced force is exerted on the jaws the moment the lifting operation occurs.

The clamp device 102 shown in FIGURE 8 is particularly useful in lifting heavy dish-shaped articles such as the cover 103 having a bottom 104 and a side 105. Such covers are usually stacked with the bottom 104 lying on the ground. In this instance it will be apparent that when the initial lifting force is applied (see the arrow 106) the clamp device 102 and the cover 103 will be moved (relatively) counterclockwise or immediately partake of a swinging action and it is particularly useful in such instances that the gravity force be applied to the jaws immediately. The structure in FIGURE 8 accomplishes the foregoing as will be described below.

The clamp device 102 has a pair of jaws 110 and 111. The jaw 110 has gripping surface 112 and the jaw 111 has gripping surface 113. As will be seen, these gripping surfaces engage the side 105 of the cover. The jaw 110 is configured with upstanding walls 114 and 115 (see FIGURE 9) within which is disposed the jaw 111. A pivot mechanism 116 is connected with the sides 114 and 115 and mounts the jaw 111. This provides for the jaws to be capable of relative rotational motion.

The side plates 114 and 115 are provided with locking surfaces such as the locking surfaces 120 and 121 on the side plate 114. The side plate 115 has identical locking surfaces. These locking surfaces support the tapered pin 122 in the same manner as the locking surfaces described heretofore. The jaw 111 has a torque surface 123 and the jaw 110 has corresponding torque surfaces such as the torque surface 124 on the wall 114. The wall 115 has an identical torque surface.

The shackle mechanism 125 comprises a pair of arms 126 and 127 which are pivotally connected to the jaw 110 by the pivot means 130. The arms 126 and 127 have apertures 128 and 129 which surround the tapered pin 122. The arms 126 and 127 are interconnected by crosspiece 131 which is adapted to be connected to a hook or the like of the hoisting mechanism.

For locking the clamp of FIGURE 8 on the article to be lifted, the tapered pin 122 is moved (in a direction out of the paper) so that the jaws are open to receive the side 105. Then the pin is moved (in a direction into the paper) wherein the increasing diameter engages the torque surfaces 123 and 124. Also, the locking surfaces 120 and 121 move the pin to the right against the torque surfaces 123 and 124. This causes the jaws to pivot so that the gripping surfaces 112 and 113 engage the cover. To tighten the jaws on the cover the pin is struck with a hammer as described heretofore.

When the hoist is operated, a force is exerted, say, in a direction shown by the arrow 106. The arms 126 and 127 start to rotate about the pivot 130 (clockwise as viewed in FIGURE 8) and engage the tapered pin 122 moving the same against the torque surfaces 123 and 124 on the jaws. Thus, the lifting operation has an immediate effect in putting the gravity force on the jaws 110 and 111. As the hoisting operation proceeds the clamp and cover swing around until the same assumes a position with the resultant center of gravity below the shackle crosspiece 131.

The arms 126 and 127 can be provided with apertures such as apertures 132 so that the crosspiece 131 can be adjustably positioned along the length of the arm.

Before closing it is pointed out that the invention contemplates a clamp structure wherein the locking surfaces are arranged so that they do not perform the function of lifting the pin as it is moved inwardly between the jaws. In such instances the locking surfaces are, for example, oriented to lie in the same plane. Thus, in a structure such as shown in FIGURE 1, the apertures 8 and 9 are modified so that they are generally rectangular or square with the pin disposed on the flat bottom side. With the flat structure, the pin is not forced upwardly as it is moved inwardly. However, with inward movement, the portion of the centerline of the pin between the jaws rises with respect to the flat surface and the diameter increases to exert forces on the torque surfaces of the jaws.

I claim:
1. A clamp removably mountable on an article to be lifted, the clamp comprising:
   a pair of jaws;
   means interconnecting said jaws and providing relative rotation of the jaws;
   means on the jaws respectively forming gripping surfaces which face one another, said jaw rotation providing for said gripping surfaces to relatively move towards and away from one another, the surfaces being relatively movable away from one another to form an opening to receive a part of the article to be lifted and the surfaces being relatively movable towards each other to engage and grip the part of the article therebetween, the gripping surface on each jaw being on one side of and spaced from the axis of rotation of the jaw;
   means on the jaws respectively forming torque surfaces which face one another, the torque surface on each jaw being spaced from and on the side of the axis of rotation of the jaw opposite to the gripping surface;
   torque applying mechanism disposed between said jaws for engagement with said torque surfaces;
   means mounting said torque applying mechanism for reciprocating movements in a first direction generally parallel the relative rotation axis of said jaws and for reciprocating movements in a second direction generally normal to said first direction, the mounting means cooperating within the torque applying mechanism so that one of the reciprocating movements in said first direction causes one of the reciprocating movements in said second direction, and the other of said reciprocating movements in said first direction causes the other of said reciprocating movements in said second direction;
   said one reciprocating movement in said first direction and said one reciprocating movement in said second direction effecting engagement between the torque applying mechanism and the torque surfaces to cause the same to move relatively away from one another and effect rotation of the jaws to cause said gripping surfaces to move relatively toward one another for engaging and gripping part of an article therebetween so as to lock the clamp on the article prior to the lifting operation; and
   said other reciprocating movement in said first direction and said other reciprocating movement in said second direction permitting the torque surfaces to move relatively toward one another for rotation of the jaws to cause said gripping surfaces to move relatively away from one another and to release the grip on said part.

2. A construction in accordance with claim 1 further including means interconnected between said jaws and said torque applying mechanism and biasing the torque mechanism for said one reciprocating movement in said first direction.

3. A clamp removably mountable on an article to be lifted, the clamp comprising:
   a pair of jaws;
   frame means;
   pivot mechanisms respectively interconnecting each jaw with said frame means, the pivot mechanisms providing for relative rotation of said jaws;
   means on the jaws respectively forming gripping surfaces which face one another, said jaw rotation providing for said gripping surfaces to relatively move towards and away from one another, the surfaces being relatively movable away from one another to form an opening to receive a part of the article to be lifted and the surfaces being relatively movable towards each other to engage and grip the part of the article therebetween, the gripping surface on each jaw being on one side of and spaced from the axis of rotation of the jaw;
   means on the jaws respectively forming torque surfaces which face one another, the torque surface on each jaw being spaced from and on the side of the axis of rotation of the jaw opposite to the gripping surface;
   a tapered pin disposed between said jaws for engagement with said torque surfaces;

means on said frame forming locking surfaces engaging and supporting said tapered pin for movement in opposite directions between the jaws, movement of the pin in one direction increasing its diameter between the jaws and the pin engaging the torque surfaces and causing the same to relatively move away from one another to effect rotation of the jaws to cause said gripping surfaces to move relatively towards one another for engaging and gripping a part of an article therebetween so as to lock the clamp on the article and movement of the pin in the opposite direction decreasing its diameter between the jaws and permitting the torque surfaces to move relatively towards one another to provide for rotation of the jaws to cause said gripping surfaces to move relatively away from one another to release the grip on said part; and lifting shackle means connected with said tapered pin, the shackle means in a lifting operation causing the pin to engage said torque surfaces and cause the same to tend to relatively move away from one another and thereby urge rotation of the jaws to cause said gripping surfaces to tightly grip the part of the article therebetween for the lifting operation.

4. A construction in accordance with claim 3 wherein said shackle mechanism comprises a pair of arms and each engaging said tapered pin and respectively disposed on opposite sides of said frame, together with a crosspiece interconnecting the arms and adapted to be engaged by the hook of a lifting mechanism.

5. A construction in accordance with claim 3 further including a tension spring surrounding said tapered pin, one end of the spring being fixed to said shackle mechanism and the other end being fixed to said pin and the spring urging the pin to move between the jaws in a direction of increasing taper and a latch mechanism connected with said shackle mechanism and adapted to engage the pin and restrain the force exerted on the pin by the spring whereby to hold the pin in a position permitting said torque surfaces to move relatively toward each other.

6. A construction in accordance with claim 3 further including means operatively connected between said jaws and said pin and biasing the pin for movement to increase the diameter of the pin between the jaws.

7. A construction in accordance with claim 3 wherein said locking surfaces are formed as by two non-parallel, facing surfaces, the orientation of which causes the pin to move in a direction toward the torque surfaces when the pin is moved to increase its diameter between the jaws.

8. A clamp removably mountable on an article to be lifted, the clamp comprising:
a pair of jaws;
frame means;
pivot mechanisms respectively interconnecting each jaw with said frame means, the pivot mechanisms providing for relative rotation of said jaws;
means on the jaws respectively forming gripping surfaces which face one another, said jaw rotation providing for said gripping surfaces to relatively move towards and away from one another, the surfaces being relatively movable away from one another to form an opening to receive a part of the article to be lifted and the surfaces being relatively movable towards each other to engage and grip the part of the article therebetween, the gripping surface on each jaw being on one side of and spaced from the axis of rotation of the jaw;
means on the jaws respectively forming torque surfaces which face one another, the torque surface on each jaw being spaced from and on the side of the axis of rotation of the jaw opposite to the gripping surface;
a tapered pin disposed between said jaws for engagement with said torque surfaces;
means mounting said pin for reciprocating movement in a first direction generally parallel the relative rotation axis of said jaws and for reciprocating movement in a second direction generally normal to said first direction, one of the reciprocating movements in said first direction increasing the diameter of the pin between the jaws and the other of the reciprocating movements in said first direction decreasing the diameter of the pin between the jaws;
said one of the reciprocating movements in said first direction and one of the reciprocating movements in said second direction effecting engagement between the tapered pin and the torque surfaces to cause the same to move relatively away from one another and effect rotation of the jaws whereby said gripping surfaces move relatively toward one another for engaging and gripping part of an article therebetween so as to lock the clamp on the article prior to the lifting operation; and
said other of said reciprocating movements in said first direction and the other of said reciprocating movements in said second direction permitting the torque surfaces to move relatively toward one another for rotation of the jaws to cause said gripping surfaces to move relatively away from one another and release the grip on said part.

9. A clamp removably mountable on an article to be lifted, the clamp comprising:
a pair of jaws;
means interconnecting said jaws and providing relative rotation of the jaws;
means on the jaws respectively forming gripping surfaces which face one another, said jaw rotation providing for said gripping surfaces to relatively move towards and away from one another, the surfaces being relatively movable away from one another to form an opening to receive a part of the article to be lifted and the surfaces being relatively movable towards each other to engage and grip the part of the article therebetween, the gripping surface on each jaw being on one side of and spaced from the axis of rotation of the jaw;
means on the jaws respectively forming torque surfaces which face one another, the torque surface on each jaw being spaced from and on the side of the axis of rotation of the jaw opposite to the gripping surface;
a tapered pin disposed between said jaws for engagement with said torque surfaces;
means on said jaws respectively forming locking surfaces engaging and supporting said tapered pin for movement in opposite directions between the jaws, movement of the pin in one direction increasing its diameter between the jaws and engaging the torque surfaces and causing the same to relatively move away from one another to effect rotation of the jaws to cause said gripping surfaces to move relatively towards one another for engaging and gripping a part of an article therebetween so as to lock the clamp on the article and movement of the pin in the opposite direction decreasing its diameter between the jaws and permitting the torque surfaces to move relatively towards one another to provide for rotation of the jaws to cause said gripping surfaces to move relatively away from one another to release the grip on said part; and
lifting shackle means connected with said tapered pin, the shackle means in a lifting operating causing the pin to engage said torque surfaces and cause the same to tend to relatively move away from one another and thereby urge relative rotation of the jaws to cause said gripping surfaces to tightly grip the part of the article therebetween for the lifting operation.

10. A construction in accordance with claim 9 wherein said shackle means comprises a pair of arms each engaging said tapered pin and respectively pivotally connected to one of said jaws, together with a crosspiece interconnecting the arms and adapted to be engaged by the hook of a lifting mechanism.

11. In a clamp removably mountable on an article to be lifted:
- a pair of jaws;
- frame means;
- pivot mechanisms respectively interconnecting each jaw with said frame means, the pivot mechanisms providing for relative rotation of said jaws;
- means on the jaws respectively forming gripping surfaces which face one another, said jaw rotation providing for said gripping surfaces to relatively move towards and away from one another, the surfaces being relatively movable away from one another to form an opening to receive a part of the article to be lifted and the surfaces being relatively movable towards each other to engage and grip the part of the article therebetween, the gripping surface on each jaw being on one side of and spaced from the axis of rotation of the jaw;
- means on said jaws respectively forming torque surfaces which face on another, the torque surface on each jaw being spaced from and on the side of the axis of rotation of the jaw opposite to the gripping surface;
- a tapered pin disposed between said jaws for engagement with said torque surfaces;
- means on said frame forming locking surfaces engaging and supporting said tapered pin for movement in opposite directions between the jaws, movement of the pin in one direction increasing its diameter between the jaws and the pin engaging the torque surfaces and causing the same to relatively move away from one another to effect rotation of the jaws to cause said gripping surfaces to move relatively towards one another for engaging and gripping a part of an article therebetween so as to lock the clamp on the article and movement of the pin in the opposite direction decreasing its diameter between the jaws and permitting the torque surfaces to move relatively towards one another to provide for rotation of the jaws to cause said gripping surfaces to move relatively away from one another to release the grip on said part;
- means on said jaws respectively forming second torque surfaces which face one another and are disposed outwardly of first said torque surfaces;
- a lifting pin disposed between said jaws for engagement with said second torque surfaces; and
- lifting shackle means connected with said lifting pin, the shackle means in a lifting operation causing the pin to engage said second torque surfaces and cause the same to tend to relatively move away from one another and thereby urge relative rotation of the jaws to cause said gripping surfaces to tightly grip the part of the article therebetween for the lifting operation.

12. In a clamp removably mountable on an article to be lifted:
- a pair of jaws;
- frame means;
- pivot mechanisms respectively interconnecting each jaw with said frame means, the pivot mechanisms providing for relative rotation of said jaws;
- means on the jaws respectively forming gripping surfaces which face one another, said jaw rotation providing for said gripping surfaces to relatively move towards and away from one another, the surfaces being relatively movable away from one another to form an opening to receive a part of the article to be lifted and the surfaces being relatively movable towards each other to engage and grip the part of the article therebetween, the gripping surface on each jaw being on one side of and spaced from the axis of rotation of the jaw;
- means on the jaws respectively forming torque surfaces which face one another, the torque surface on each jaw being spaced from and on the side of the axis of rotation of the jaw opposite to the gripping surface;
- an eccentric disposed between said jaws for engagement with said torque surfaces;
- means on said frame mounting said eccentric for rotation in opposite directions between the jaws, rotation of the eccentric in one direction engaging the same with the torque surfaces and causing the surfaces to relatively move away from one another to effect rotation of the jaws to cause said gripping surfaces to move relatively towards one another for engaging and gripping a part of an article therebetween so as to lock the clamp on the article and rotation of the eccentric in the opposite direction permitting the torque surfaces to move relatively towards one another to provide for rotation of the jaws to cause said gripping surfaces to move relatively away from one another to release the grip on said part;
- means on said jaws respectively forming second torque surfaces which face one another and are disposed outwardly of first said torque surfaces;
- a lifting pin disposed between said jaws for engagement with said second torque surfaces; and
- lifting shackle means connected with said lifting pin, the shackle means in a lifting operation causing the pin to engage said second torque surfaces cause the same to tend to relatively move away from one another and thereby urge relative rotation of the jaws to cause said gripping surfaces to tightly grip the part of the article therebetween for the lifting operation.

13. A clamp removably mountable on an article to be lifted, the clamp comprising:
- a pair of jaws, one of the jaws being formed with a slot within which is disposed the other jaw;
- pivot means on said one jaw and extending across said slot and mounting the other jaw providing relative rotation of the jaws;
- means on the jaws respectively forming gripping surfaces which face one another, said jaw rotation providing for said gripping surfaces to relatively move towards and away from one another, the surfaces being relatively movable away from one another to form an opening to receive a part of the article to be lifted and the surfaces being relatively movable towards each other to engage and grip the part of the article therebetween, the gripping surface on each jaw being on one side of and spaced from the axis of rotation of the jaw;
- means on said jaws respectively forming torque surfaces which face one another, the torque surface on each jaw being spaced from and on the side of the axis of rotation of the jaw opposite to the gripping surface;
- a tapered pin disposed between said jaws for engagement with said torque surfaces;
- means on said jaws respectively forming locking surfaces engaging and supporting said tapered pin for movement in opposite directions between the jaws, movement of the pin in one direction increasing its diameter between the jaws and engaging the torque surfaces and causing the same to relatively move away from one another to effect rotation of the jaws to cause said gripping surfaces to move relatively towards one another for engaging and gripping a part of an article therebetween so as to lock the clamp on the article and movement of the pin in the opposite direction decreasing its diameter between the jaws and permitting the torque surfaces to move relatively towards one another to provide for rotation of the jaws to cause said gripping surfaces to move relatively away from one another to release the grip on said part; and lifting shackle means comprising a pair of arms each connected with said tapered pin and respectively pivotally connected to said one jaw, the shackle means in a lifting operation causing the tapered pin to engage said torque surfaces and cause the same to tend to relatively move away from one another and thereby urge relative rotation of the jaws to cause said gripping surfaces to tightly grip the part of the article therebetween for the lifting operation.

References Cited by the Examiner

UNITED STATES PATENTS

| | | | |
|---|---|---|---|
| 2,250,836 | 7/1941 | Landers | 294—104 |
| 2,324,362 | 7/1943 | Chandler | 294—104 |

FOREIGN PATENTS

| | | |
|---|---|---|
| 12,567 | 5/1911 | Great Britain. |
| 636,837 | 5/1956 | Great Britain. |

GERALD M. FORLENZA, *Primary Examiner.*

G. F. ABRAHAM, *Assistant Examiner.*

UNITED STATES PATENT OFFICE
CERTIFICATE OF CORRECTION

Patent No. 3,318,630                                          May 9, 1967

John G. Bryant

It is hereby certified that error appears in the above numbered patent requiring correction and that the said Letters Patent should read as corrected below.

Column 1, line 48, after "provide" insert -- for --; column 2, line 43, strike out "the", first occurrence; column 7, line 31, for "thee" read -- the --; column 10, line 68, for "operating" read -- operation --; column 12, line 34, after "surfaces" insert -- and --.

Signed and sealed this 28th day of November 1967.

(SEAL)
Attest:

Edward M. Fletcher, Jr.
Attesting Officer

EDWARD J. BRENNER
Commissioner of Patents